Jan. 3, 1967  G. V. J. QUENTIN  3,295,476
COMBUSTION APPARATUS FOR AGGLUTINANT AND SWELLING COALS HAVING
A HIGH CONTENT OF VOLATILE MATERIALS
Filed June 18, 1963  6 Sheets-Sheet 1

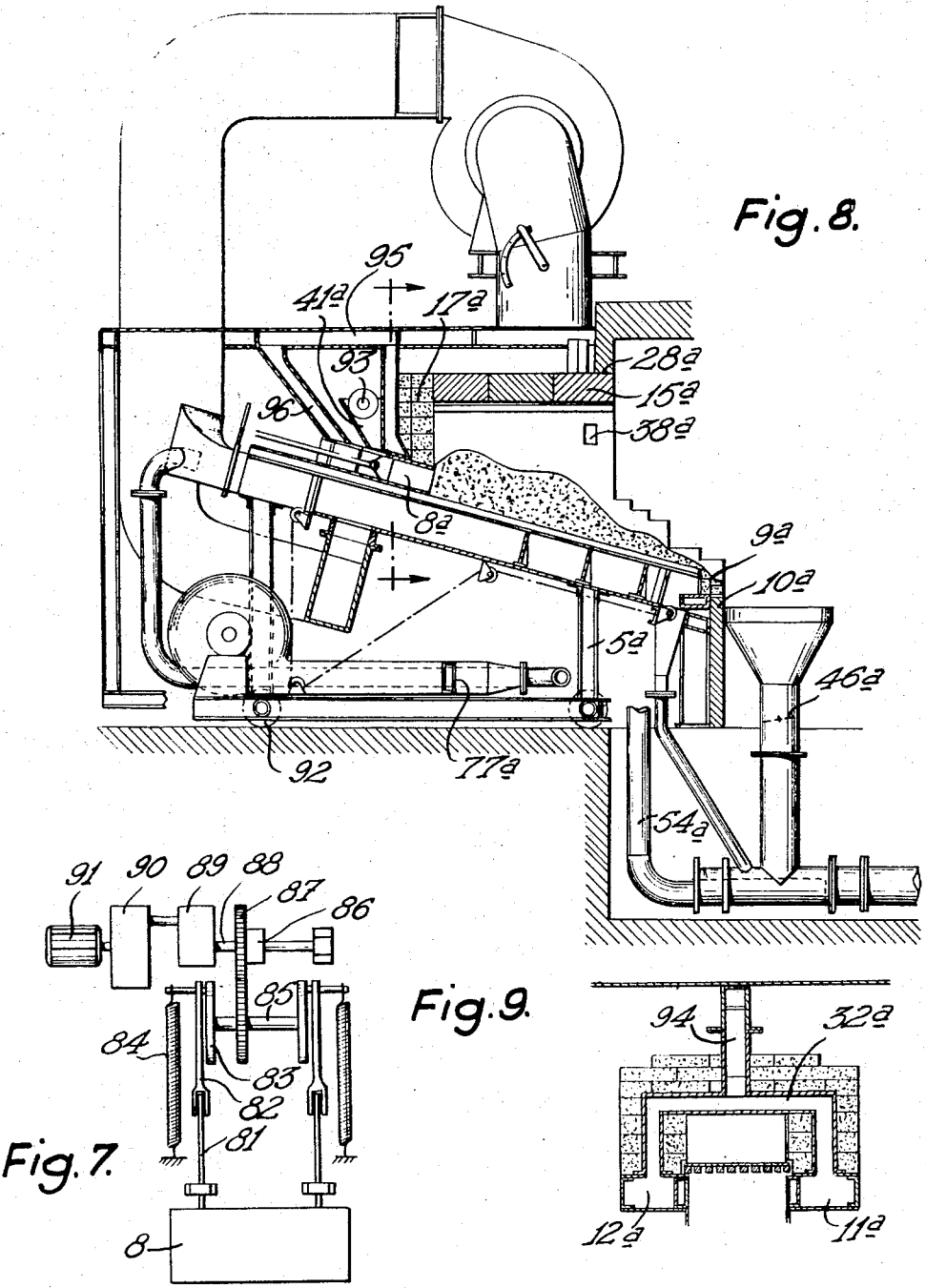

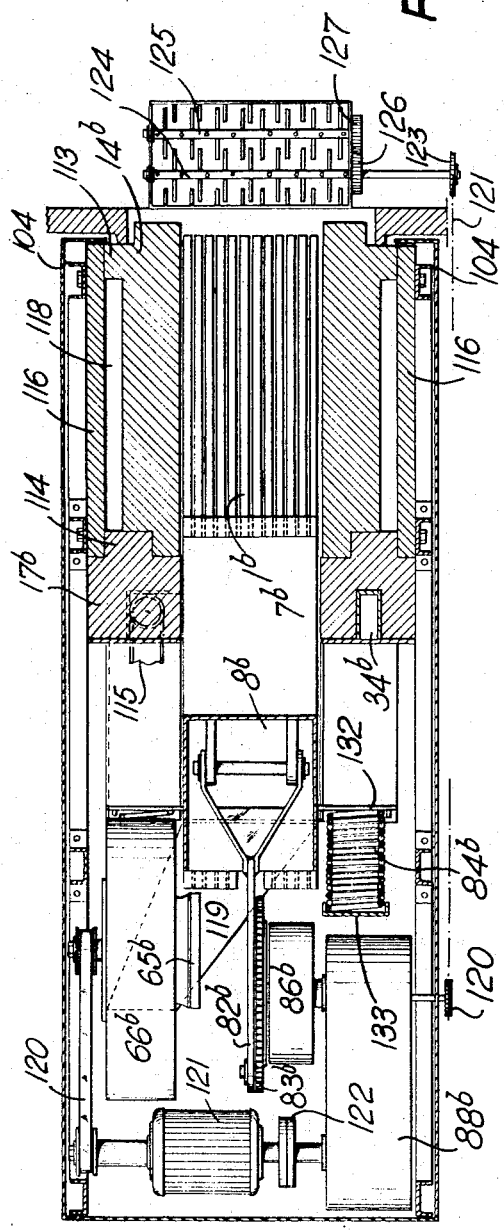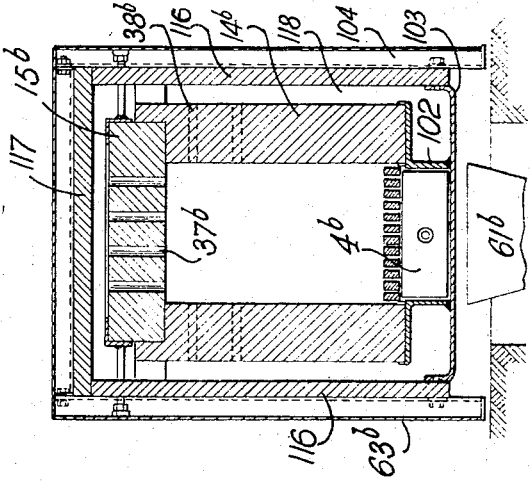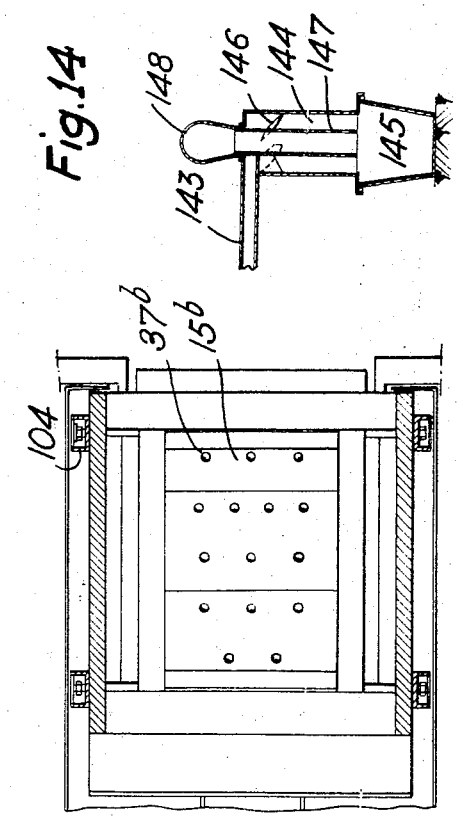

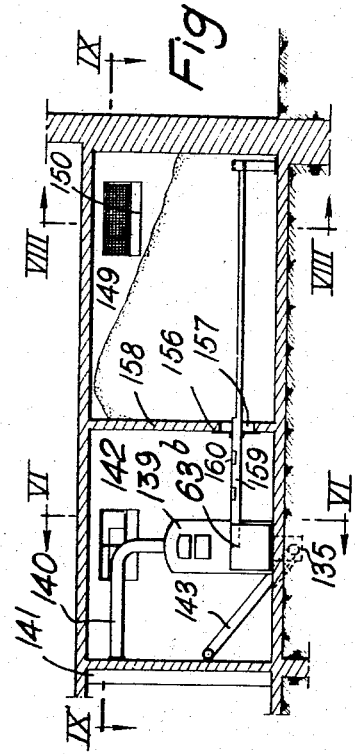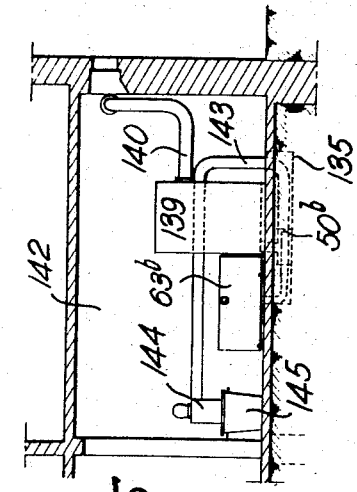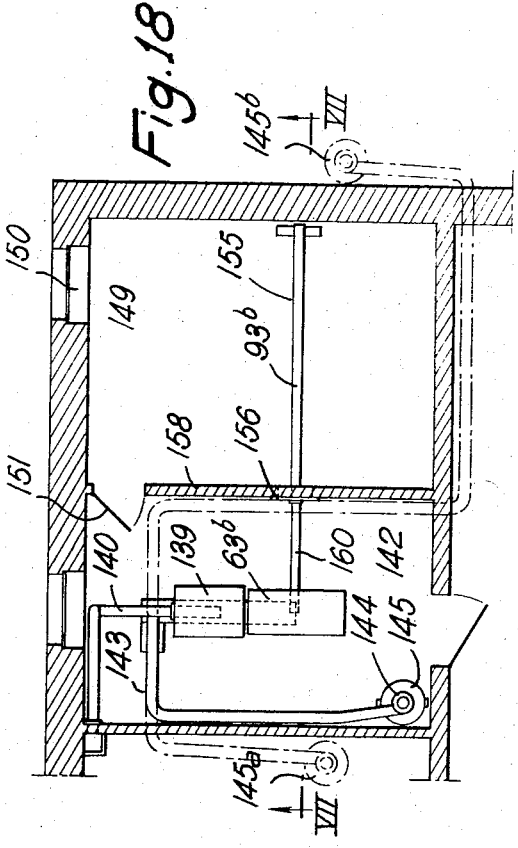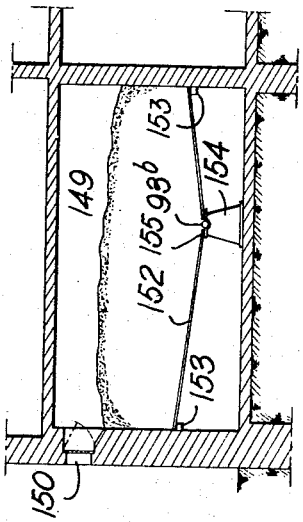

United States Patent Office 3,295,476
Patented Jan. 3, 1967

3,295,476
COMBUSTION APPARATUS FOR AGGLUTINANT AND SWELLING COALS HAVING A HIGH CONTENT OF VOLATILE MATERIALS
Georges Victor Jacques Quentin, Saint-Avold, Moselle, France, assignor to Houilleres du Bassin de Lorraine, Faulquemont, Moselle, France
Filed June 18, 1963, Ser. No. 288,732
Claims priority, application France, June 18, 1962, 901,007, Patent 84,606
18 Claims. (Cl. 110—8)

Coal combustion chambers are customarily built to permit operation, without notable transformations, with all kinds of coals, be they of the lean, semi-anthracite or blazing type. By the specialization of a certain type of chamber, however, it is possible to greatly reduce installation costs and increase efficiency at the same time.

The present invention has precisely for its object, by specially adapting a fire-chamber designed for a solid, agglutinant and swelling fuel with a high content of volatile substances, such as coal of the blazing type, to provide highly efficient operation under practical conditions comparable to those possible with liquid or gaseous fuel burners, and for investment and upkeep costs comparable to those of such burners, while retaining the advantage of the lower cost of the solid fuel used.

This invention accordingly relates to a combustion method for agglutinant swelling coals with a high content of volatile substances, such as blazing coals, in accordance with which method said coals are burned in a thick incandescent layer by subjecting the latter to an accentuated thermal shock, this incandescent condition being sustained only by a relatively small quantity of primary air and said layer being propelled for its combustion adjacent to secondary air inlets supplying violent, turbulent and hot currents, and being conveyed to an ash collecting point at the end of such propulsion after completion of said combustion.

Such an operating method enables obtaining, in the incandescence zone, both abundant distillation and accelerated combustion which render the structure of the bed uniform by a homogeneous swelling and a uniformly distributed agglutination, leading to a reduction of the area in which combustion of the cokes is completed and to a consequent shortening of the length of the fire.

The carrying into practice of such a method entails the use only of simple and compact apparatus.

The invention likewise encompasses such apparatus, and more particularly a fire-chamber in which an inclined grid with fixed elements consisting of parallel, smooth and relatively close-pitched bars is associated, on one side, with an obturation type fuel supply mechanism and, on the other, in a less elevated position, with a cinder evacuator, with a radiating crown at a relatively small distance above the layer in its area of maximum thickness, and with distributors for supplying primary air beneath said grid and secondary air chiefly beneath said crown.

Such fire-chambers, which form veritable burners, are economical to build and easy to maintain; in addition, they are highly efficient and can be adapted to various maximum powers, while their flexibility of operation in each category is great; they can readily be associated to fuel and air supply devices, as well as to cinder discharging mechanisms, such combined systems offering automation possibilities comparable to those of fluid-fuel-type burners even in respect of ignition, thus dispensing with the need for any form of handling or supervision, which are advantages characteristic of liquid or gaseous fuel installations.

In order to enable a fire-chamber burner of the type hereinbefore disclosed, involving application of the aforementioned method, to be adapted to relatively low calorific powers such as those encountered with domestic type firechambers in individual houses, flats and the like, the grid is substantially less inclined. It is associated with a substantially flat crown provided with likewise flat pillars.

Such crowns and pillars are bricked with refractory elements, while the crown elements are provided with joggles for joining them together.

The secondary air inlets consist of simple holes extending through the bricked elements.

About the bricked envelope of the fire-chamber burner are disposed flat refractory plates which are so spaced from said bricking as to provide passageways through which the secondary air is admitted.

The crown gable is cooled by a single conduit to which is connected a by-pass tapped off a secondary-air chamber, and the outlet from said single conduit takes place through a bent duct which leads the cooling air outside the gable in a jet designed to cool the ram. Such cooling is effected principally over the upper face of said ram, in order that when the charging hole is opened and said ram retracted, the blowing should prevent any reflux of the flames or the gas from the fire chamber towards the fuel supply.

Within the chamber surmounted by the grid and which distributes primary air is fitted a longitudinally adjustable solid valve and, further upstream, a second movable valve adapted to be retracted during operation at full capacity. Provision is additionally made for an initially adjustable diaphragm which meters the primary air in general and, upstream of said diaphragm, for a valve adapted to alternatively seal off either said chamber or a by-pass conduit, whereby to alternatively blast away the cinders or supply primary air. This arrangement arises from the fact that, for simplification purposes, such a fire-chamber/burner is provided with a single blower which fulfils the several functions of supplying secondary air, supplying primary air and supplying cinder blasting air.

The delivery pressure characteristics of said blower are adapted to suit those required to achieve cinder blasting, the primary air and secondary air pressures being adjusted to lower values by means of adjustable diaphragms provided in the corresponding conduits tapped from the delivery end of said blower.

Considering now the coal supply aspect, the upper face of the ram is surmounted by an intermediate hopper, the opening of which is uncovered as the forward edge of said ram withdraws. The upper portion of said hopper receives a slow-moving transverse screw conveyor for drawing coal from the bunker, said screw being driven by a chain off a sprocket mounted on the secondary shaft of a clutch disposed at the take-off end of a reduction gear which is in turn driven by the same motor which drives the blower.

Considering next the cinder evacuation system, the forward portion of the grid and its sill surmount a roll-type disintegrator positioned at the top of a cinder hopper and surmounting a shut-off valve which opens periodically in response to the pull of a rope connected to the ram actuating crank, said rolls being driven by a chain transmission off the reduction gear take-off shaft.

An enclosure is provided about the assembly consisting of the fire-chamber/burner, the motor-reduction gear unit and the blower, the whole being mounted on wheels to enable it to be moved up to the boiler opening, namely the opening which is normally sealed off by the door of the ash-pit in existing boilers, for example.

Along the rolling track is provided an opening for connection with the cinder blasting conduit and, facing this opening, the end closure of the grid chamber is provided with a retractable connecting sleeve to which is associated an externally accessible operating member.

Provision is preferably made along said track for a pit of small size to which is likewise associated a hopper for collecting the sifted material, positioned opposite the lowermost point of the grid chamber.

The ash is discharged pneumatically at a distance by means of a conduit leading up to a filtration and depositing apparatus which allows the blast air to emerge but deposits the cinders in a subjacent removable container such as a bin.

The fuel can be drawn from the bunker on either side of the fire-chamber/burner by accordingly installing the conveyor screw, but it is preferable to place the same on supports and within an upwardly open channel forming the corner of a slightly raised dihedral deck provided in said bunker.

Provision is thus made for a fully automatic apparatus which frees the operator from all handling operations by slaving the motor, clutch and various valve controls at once to a stop-start switch, a programmed timer and a boiler or room thermostat, for instance.

The description which follows with reference to the accompanying drawings, which are filed by way of non-limitative examples, will give a clear understanding of how the invention can be carried into practice and will disclose yet further advantageous particularities thereof which naturally fall within the scope of the invention.

Referring to the drawings filed herewith:

FIG. 7 is a diagram of the mechanism for supplying the fire-chamber with solid fuel;

FIG. 8 shows in longitudinal section similar to that of FIG. 1, but on an enlarged scale, a fire-chamber/burner of lower power and embodying alternative arrangements;

FIG. 9 shows in schematic section the crown gable of the burner of FIG. 8;

FIG. 11 is a section of said fire-chamber/burner taken through a plane parallel with that of its grid;

FIG. 12 shows the fire-chamber in partial section through a plane parallel to that of the grid but passing above the crown;

FIG. 13 is a cross-sectional view of the fire-chamber;

FIG. 14 shows on a reduced scale the ash collecting device;

FIG. 15 is a schematic side elevation view of such a fire-chamber/burner on a boiler housed in a building, the section being taken through the line VI—VI of FIG. 16;

FIG. 16 shows the building in partial cross-section, revealing the boiler room and the fuel bunker;

FIG. 17 is a section taken through the line VIII—VIII of FIG. 16; and

FIG. 18 is a sectional view of the general lay-out, the section being taken through the line IX—IX of FIG. 16.

Figure 1:
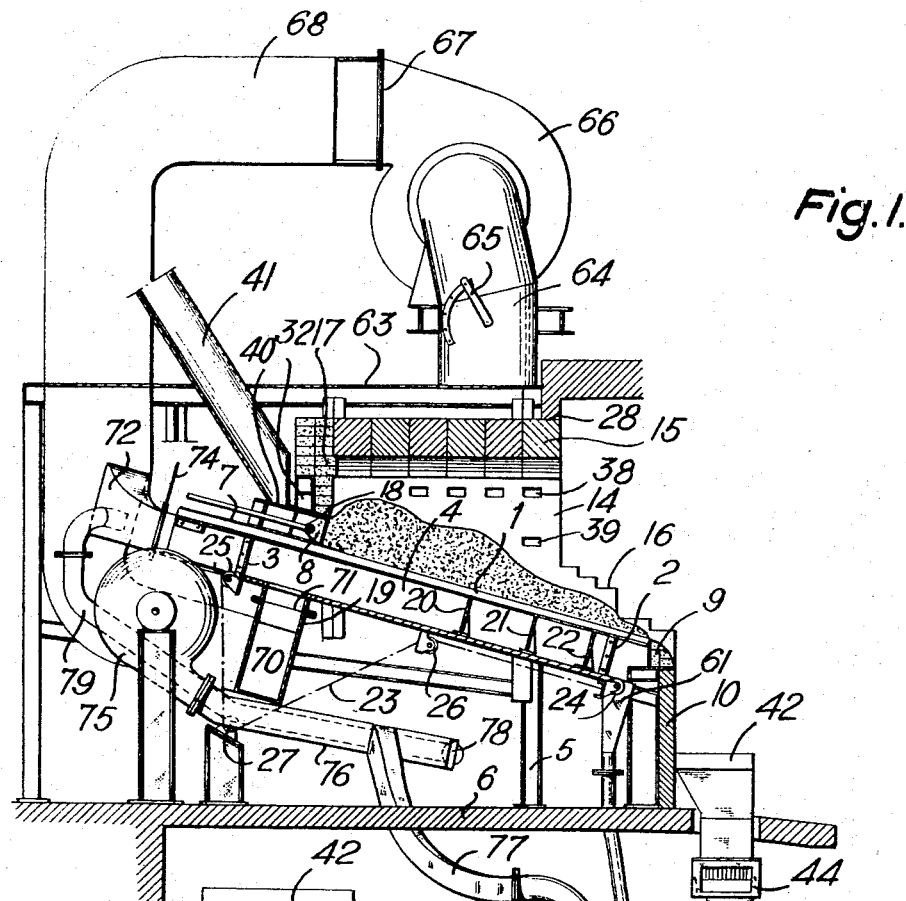
FIG. 1 shows in schematic longitudinal section a fire-chamber/burner according to the invention.
Figure 2:
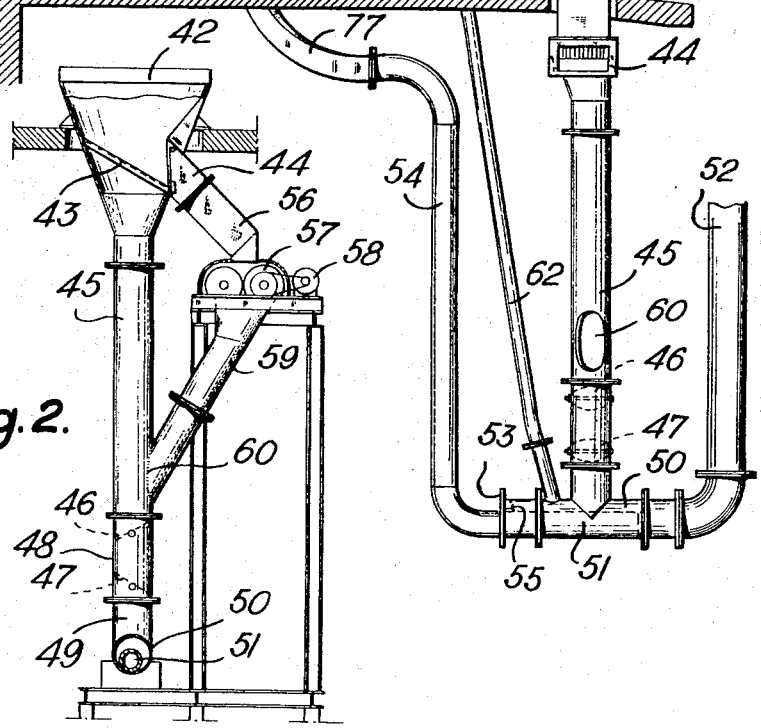
FIG. 2 shows, in partial side elevation, the ash evacuation mechanism.
Figure 5:
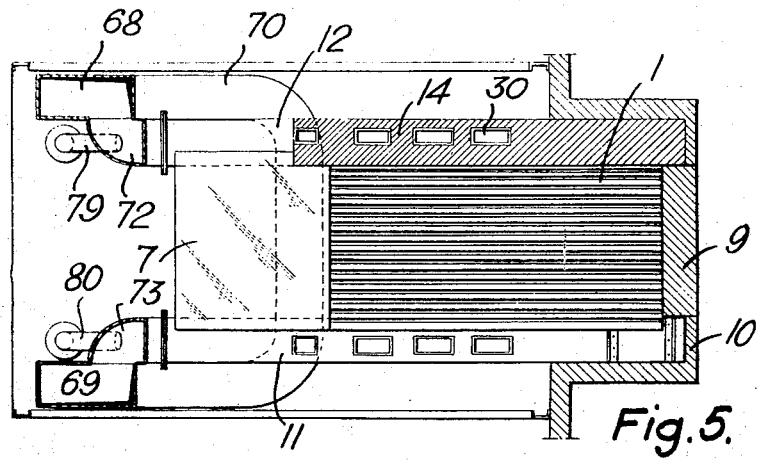
FIG. 5 is a section of the fire-chamber taken through a plane parallel with the upper face of the grid and adjacent thereto.
Figure 6:
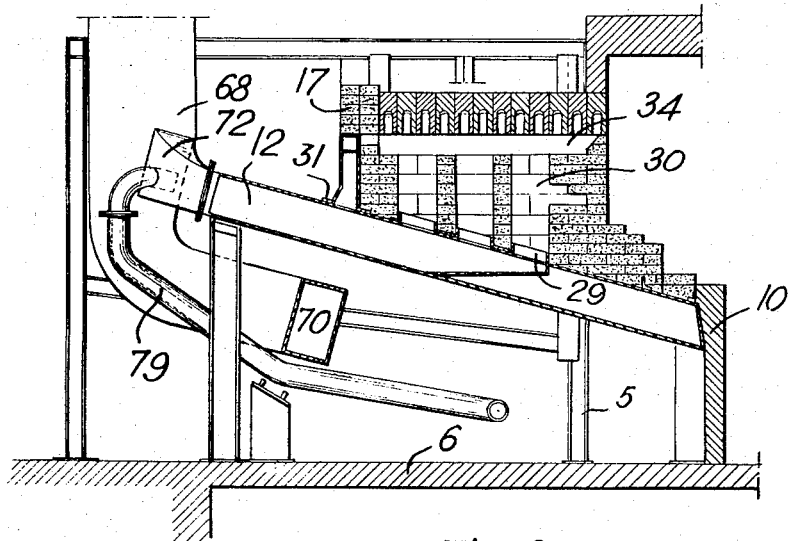
FIG. 6 shows in diagrammatic section one of the crown pillars.
Figure 3:
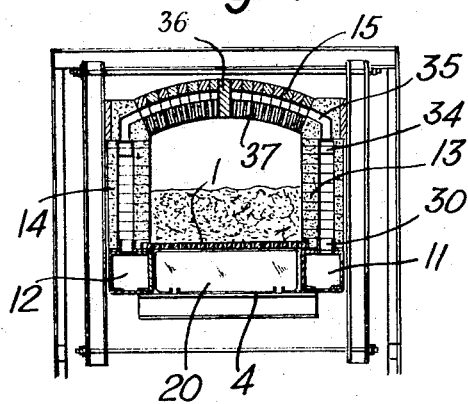
FIG. 3 is a cross-section of such a fire-chamber.
Figure 4:
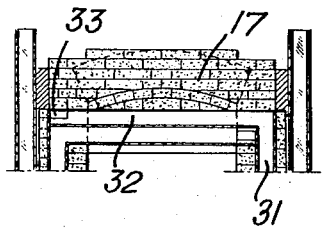
FIG. 4 shows in schematic cross-section the crown gable.

Referring first to FIG. 1, the fire-chamber/burner shown thereon includes a grid 1 consisting of smooth, parallel and inclined bars spaced at regular and relatively small intervals whereby to impart low permeability to said grid. Said bars have their extremities connected to transverse front and rear members 3 and 2 respectively forming part of a lower box 4, similar intermediate supporting means being provided where necessary. Said box is supported on suitable posts and stays 5 resting on the ground 6, while said bars have their lower extremities in abutment and are adapted to slide over their upper bearer to enable expansion to take place freely.

Over its forward uppermost portion, the grid is covered by a solid slide-plate 7 associated with a ram 8, which plate will be described hereinafter. The rear lowermost portion of the grid abuts against an ash overflow sill 9 located level with a rear supporting and shutting-off partition 10 which separates said fire-chamber from an apparatus for utilizing the heat produced.

Laterally, grid 1 is bordered by a pair of secondary-air supply boxes 11 and 12, resting on members 5, of identical inclination to said grid and serving to support the refractory bricks constituting the pillars 13 and 14 supporting a crown 15. The rear portion of the crown pillars is extended as far as the partition 10 by stepped walls 16 aligned with these pillars and constitutes the opening through which the combustion gas issues. The forward part of the crown is closed by a gable 17 beneath which is provided a smooth partition 18 surmounting the passageway for ram 8. The generatrix of the arch is horizontal and consequently diverges with respect to the grid plane, but of course it will be understood that any other suitable flared configuration could be adopted.

The box 4 is hollow and its lower wall is connected to a central stub-pipe 19 opening beneath the solid plate 8, thereby forming primary-air supply ducts underneath said plate. Box 4 additionally contains sliding valves 20, 21 and 22 provided with calibrated holes of decreasing section towards valve 22 which alone is devoid of holes, said valves being gapped at distances which are invariable or not and adjustable in operation if need be. Said valves slide beneath the grid and along the bottom of box 4, perpendicularly to the plane of said grid and in response to lateral actuating endless chains 23 to which they are coupled directly in the event that a fixed spacing between said valves is sufficient. Each chain has one of its runs parallel with the bottom of the box and is caused to run through the latter by end pulleys 24 and 25, being supported by an outer run which passes over a counter-pulley 26 and a driving pulley 27, the whole arrangement being designed to permit adjustment of said valves beneath the grid. Said valves apportion and bound the zones reached by the primary air led in through stub-pipe 19, with differential flow rates adjusted beneath the thereby staged zones.

The upper portion of crown 15 and the external walls of the pillars are set into the aperture 28 of an apparatus for utilizing the heat produced, such apparatus being a heat exchanger or the like.

The lateral boxes 11 and 12 are provided with flanges such as 29, set into ascending chimneys 30 embodied in the pillars. In the example specifically shown in FIGS. 1 through 5, each pillar has three such chimneys 30.

Level with gable 17, boxes 11 and 12 are equipped with stub-pipes 31. Each stub-pipe 31 extends to one of the extremities of a transverse conduit 32 for cooling gable 17, which conduit opens through an orifice 33 beneath the gable 15 where it delivers part of the secondary air.

The chimneys 30 intercommunicate in their upper parts, within each pillar, through a distribution manifold 34. The crown 15 is formed of hollow elements, and in each of the bricked arches is a passageway 35 bounded by a solid keystone 36. Each crown brick has a solid dorsal portion, but ventral nozzles 37 are provided beneath said crown, thereby providing communication between each passageway 35 and the internal space of the fire-chamber.

In addition, at selected points in the pillars, the manifold 34 and certain of the chimneys 30 are caused to communicate through orifices 38 and 39 with the interior space of the fire-chamber, in order to ensure proper distribution for the jets of secondary-air introduced in increasing abundance into the zone where the combustion is completed.

Ram 8 can, if desired, be adapted for reciprocating motion in its slideway, which slideway is bounded at the bottom by plate 7 and at the top by the upper wall 18 which is in contact with one of the conduits 32. In forward travel, said reciprocating motion is limited to a position flush with the inner wall of gable 17 and, in rearward travel, causes uncovering of an aperture 40 communicating with a conduit 41 for supplying the solid fuel by gravity feed. Conduit 41 is sharply inclined and opens in a supply hopper (not shown).

The ram actuating mechanism will now be described hereinbelow. On the rear side of grid 1, along the lowermost edge bordered by the sill 9 surmounting the wall 10, is disposed a cinder reception funnel 42 into which is placed a grid 43 consisting of sharply inclined bars connected to the lower part of a by-pass stub-pipe 44. This by-pass is designed to provide passageway for the agglomerated portions of ash that fail to disintegrate on falling onto bars 43. Beneath said bars, funnel 42 is connected to a vertical conduit 45. The base of conduit 45 is obturated by a pair of flaps 46 and 47 which are automatically returned to the closed position by a counterweight. These superimposed flaps seal the conduit alternately.

The barrel-plate 48 supporting said pair of flaps is connected to a transverse barrel-plate 50 provided with a nozzle 51 for admitting air under pressure for pneumatic expulsion of the ash, and said nozzle connects with an ascending conduit 52 leading into an ash receptacle (not shown) contained within a space bounded by an air exhausting filter which allows the air under pressure to pass through but retains all fly-ash. In order to entrain said ash, the partition 53 which closes barrel-plate 50 and through which extends the conduit 54 for supplying nozzle 51 includes a gravity-closed automatic valve 55 which, on being opened by the influence to which it is subjected, admits the entrained atmospheric air designed to sweep away the dusty ash accumulation above nozzle 51.

Stub-pipe 44 is co-extensive with grid 43 and is connected to a conduit 56 for conveying the agglomerated ash above a crusher 57 the moving members of which are driven by an electric motor 58. The bottom part of the crusher is connected to an inclined conduit 59 which is joined obliquely at 60 to conduit 45.

Said agglomerated and crushed ash thus joins the dusty ash which had passed directly through grid 43.

The lowermost point of the bottom of box 4 is open and surmounts a collecting funnel 61 connected through a pipe 62 directly to barrel-plate 50, whereby to expel any ash or residues that may have passed through grid 1 and dropped to the bottom of the box by a sifting process.

Considering next the air distribution system, the fire-chamber/burner hereinbefore described is surrounded by a sheet-metal jacket 63 which protects the exterior space from radiation lost by the refractory cell, the grid and its box, and which serves as a suction duct for recovering this heat and imparting it to the combustion air. To this end, a judiciously selected point on jacket 63 is open to admit air, and to the upper wall of jacket 63 is connected a conduit 64 provided with an inlet adjustment valve 65 and leading to the intake of a blower 66. The delivery outlet 67 of said blower leads to a fork which divides the delivery air between two lateral ducts 68 and 69 (see FIGS. 1 and 5) which run downwardly and extend through the wall of jacket 63. Said two lateral ducts join at their lowermost points into a single conduit 70 which runs beneath the grid box under the ram and which can be opened by means of an adjustable flap 71 in stub-pipe 19. The primary air reaching this area cools the solid plate and the corresponding face of the ram, and this air divides into fillets through the gaps between the bars.

In an intermediate region comprised beneath jacket 63, ducts 68 and 69 include by-pass take-offs 72 and 73 each of which is provided with an adjustment diaphragm 74, and these take-offs are respectively connected to ducts 11 and 12.

Within the space left free behind the boxes 4 and the transverse branch of conduit 70, beneath plate 7, is disposed a booster fan 75 the intake of which also opens beneath jacket 63 and the delivery end of which is shaped as a substantially axial tube 76 onto which is connected a curved pipe 77 leading into the ash driving conduit 54. In addition, at the extremity of axial conduit 76 is provided a junction with two branches 78 (with adjustment diaphragm and shut-off valves (not shown)) which are reduced in section to join onto pipes 79 and 80 disposed beneath the lateral ducts 11 and 12 and provided with ascending branches with bent terminal portions, respectively penetrating into the take-offs 72 and 73, where they form injection nozzles. An automatic changeover flap on the conduit 76 directs the compressed air towards the ash, through 77, or towards the secondary blowing circuits, through 78, 79 and 80.

From the illustration in FIG. 7 of the mechanism for operating ram 8, it will be seen that the latter is controlled by pushrods 81 which extend through guides and are pivotally connected to rods 82 which cooperate with corresponding plates 83 each of which has an eccentric throw. Return springs 84 are connected to said throws. The shaft 85 which is common to plates 83 is coupled through gears to a motor set having at its output end an electromagnetic clutch 86 for driving the gear-train input pinion 87 from the take-off shaft 88 of a speed variator 89 the input shaft of which is driven by the reduction gear 90 which is driven in turn by an electric motor 91.

The embodiment shown in FIGS. 8 and 9 and which relates to a fire-chamber/burner of lesser power differs from that hereinbefore described in points of detail, as well as in the scale of construction. In this embodiment, it can be seen that the member 5a supporting the assembly is designed to be supported through wheels 92 on a track, thereby enabling the fire-chamber/burner to be moved towards or away from the aperture 28a of the utilization apparatus. The sill 9a must be supported solely by member 5a and must not rest upon the partition 10a. Suitable unions, preferably of the quick junction and separation type, must be provided, particularly between the cinder blasting conduit 54a and the duct 77a rigid with the carriage.

Considering next the question of the coal supply, the latter can be accomplished by means of a transverse screw 93 which takes up the fuel from a bunker and conveys it to an intermediate hopper 41a which communicates through its orifice with the box in which the ram 8a travels, said screw being retractable when it is necessary to displace the fire-chamber/burner.

Since a fire-chamber of lesser power is involved, gable 17a can be cooled by means of a simple duct 32a which is supplied through both its extremities off the supporting ducts 11a and 12a, in conjunction with a single intermediate ascending outlet 94, which, through a bent conduit 95, conveys the cooling air for said gable through a nozzle 96 to the ram guiding box whereby to cool the latter; the quantity of products distilled beneath the forward portion of crown 15a does not, in the hottest region, require immediate contact with a quantity of secondary air as large as in the case of the high-power fire-chamber.

Similarly, a single secondary-air exit 38a in each pillar can be adequate. The crown nozzles (not shown) are likewise less numerous.

The apparatus hereinbefore described operates as follows:

The fuel, particularly the blazing coal, conveyed by ram 8 collects and crowds into a thick sustained layer beneath crown 15, within which crown is established a zone of intense combustion and gasification at the head of the fire-chamber; for in this region the fuel is very close to said crown and is consequently subjected to intense radiation from the crown and from the pillars, notwithstanding the protective cooling of gable 17 and the ram, as a result of which combustion of the distillates and part of the fuel is accelerated, in conjunction with an immediate regularization of the bed structure through a homogeneous swelling and agglutination, these two phenomena soon being uniformly distributed.

In comparison with fire-chambers of the mechanical grid type, for instance, the layer formed in such a fire-chamber/burner is 50 to 150 percent thicker, as measured on fresh coal, and this thickness is further enhanced by the swelling of the fuel used.

These two combined phenomena of swelling and agglutination of the blazing coals, conventionally designated in the International Classification by the numbers 611, 621, 622, 632, 633, 634, 635, 711 and 721 for example, not only ensure combustion and gasification of excellent quality by regularizing in homogeneous fashion the permeability of the bed in respect to the gas flowing therethrough (primary air and distillate) in all the zones of the bed, but also, as a direct consequence, shortening of the fire, thereby enabling operation to take place with relatively very short grids.

Since the permeability of such a grid need not be greater than the relatively low permeability of the bed undergoing combustion, said grid can be of very simple type, as hereinabove described; it is provided with an equivalent degree of permeability at the most, and since the swelling and the agglutination in point of fact increase the orifice calibre of the fuel, this simple design with fixed, parallel and smooth bars that are easily replaceable due to their being fitted into end racks provided on the supporting members, additionally facilitates sliding of the coherent layer as a whole under the action of the ram and the slope of said grid. This coherent layer diminishes in thickness only near the rear of the grid and at the base of the latter where said layer is composed only of cinders lacking cohesion, which break up as they pass over the sill 9 and disintegrate as they strike the grid 43, as explained precedingly.

In the zone of incandescence, both combustion and gasification are activated to a maximum by reason of the blown primary air arriving through the stub-pipe 19 opposite the ram in the thrust-in position. This provides optimum action on the quasi-instantaneous gasification, on the swelling and on the agglutination.

Indeed, by means of valves 20 through 22, it is possible, when operation is slowed down, to reduce the area subjected to the principal blowing without a concurrent reduction in the air pressure. For this reason, the blower can be of the single-speed type.

Being blown convergently through the crown nozzles and the facing apertures 38 of the pillars, the hot secondary air is subjected to an extensive dividing effect and to heavy turbulence, which results in the distillation gases being burnt at high temperature and emitting intense heat of radiation. In turn, this permits, firstly, intense heating of the crown and of the face exposed to the fuel bed and, secondly, complete combustion to be achieved with less total excess air, thus ensuring optimum combustion efficiency.

When operation is slowed down, control over flap 85 permits at the same time of reducing the primary and secondary air flows. In addition, the chains 23 are operated in order to raise valves 20 through 22 towards the front part of the grid, and all these components, i.e. the chains and the shut-off means, can be operated jointly by a single control means, to wit the means for adjusting the variator 89 inserted into the means for transmitting power to ram 8.

For operation in the slow, standby or pilot modes, blower 66 and ram motor 91 can be stopped and the electromagnetic clutch rendered inoperative. A switch controlled by a thermostat or a manostat on the utilization apparatus can accordingly cut off the current supplied to these two motors and to the clutch. Thus the ram is urged back into the position of obturation by its springs. Said switch is preferably a changeover switch, which, during this standby period, causes the motor of compressor 75 to be energized. While said compressor is operating, the crusher 57 is also rendered operative by its motor 58, by using a common feed to both these motors.

Thus execution of the cinder evacuation phase is combined with the supply to the fire-chamber of secondary air at an extremely low rate, by an influence process, under the action of nozzles 79 and 80 in the lateral boxes 11 and 12. The fire is thus sustained and ready for a fresh start-up.

The electromagnetic clutch 86 is also used as a force limiter, which limitation is susceptible of adjustment in a potentiometric way. Said clutch is energized in parallel with motor 91. A safety device is provided to cut off the power to the clutch in the event of the ram being jammed by extraneous matter.

With regard to the booster 75, the supply can be ensured independently of the changeover means referred to precedingly, by means of a timer, whereby to evacuate the cinders periodically as normal operation proceeds. During such operation, communication must be cut off between said booster and nozzles 79 and 80 in order not to disrupt the supply of secondary air and in order to enhance the evacuating action, by means of shut-off means electromagnetically controlled off the shunt 78 (not shown).

As may be clearly seen from FIG 8, the operating phases described with reference to the embodiments of FIGS. 1 through 7 can be applied in like manner, notwithstanding the simplification achieved as regards the cinders evacuation means, which in this case only include a single automatic flap 46a.

In connection with the fuel supply, it should also be noted that the springs 84 are in all cases able to drive ram 8 into its extended position even in the event of failure of the electric supply, and that this action is facilitated by the uncoupling of the clutch.

It goes without saying that, without departing from the scope of the invention, many modifications can be made to the specific embodiments hereinbefore described. By way of example, the grid inclination is preferably about 15°, but could be included between 5° and 20°. The divergence between the fuel layer and the crown could be varied, while the arched profile could be cylindrical or otherwise. Similarly, instead of feeding the coal by an obturating ram fed from a reserve hopper or by a transverse screw which draws coal from a bunker, recourse can be had to any other means of supply which results in the formation of a thick layer in the fuel insertion area.

With regard to the powers and the size of the apparatus utilized, wide variations are permissible; however, for a given power, as in the case of liquid fuel burners, it is always preferable to utilize a plurality of fire-chamber/burners, each having only one average operating power equal to a fraction of the total power required. Lastly, like those of lower power, the large-power fire-chamber/burners can be mounted on wheels in order to render them mobile also.

Other combined and automation control elements can be added to the arrangements described hereinabove. In addition, in order to confer upon such fire-chamber/burners ignition advantages identical to those found on liquid fuel burners, such fire-chambers can be provided with retractable ignition probes that penetrate sideways into the layer of fuel and consist of shielded electrical resistances, for example. Lastly, the grid-box shut-off valves could be controlled otherwise than by chains, for instance by nuts and screws in conjunction with a control means which maintains the constancy of their mutual distances.

Figure 10:
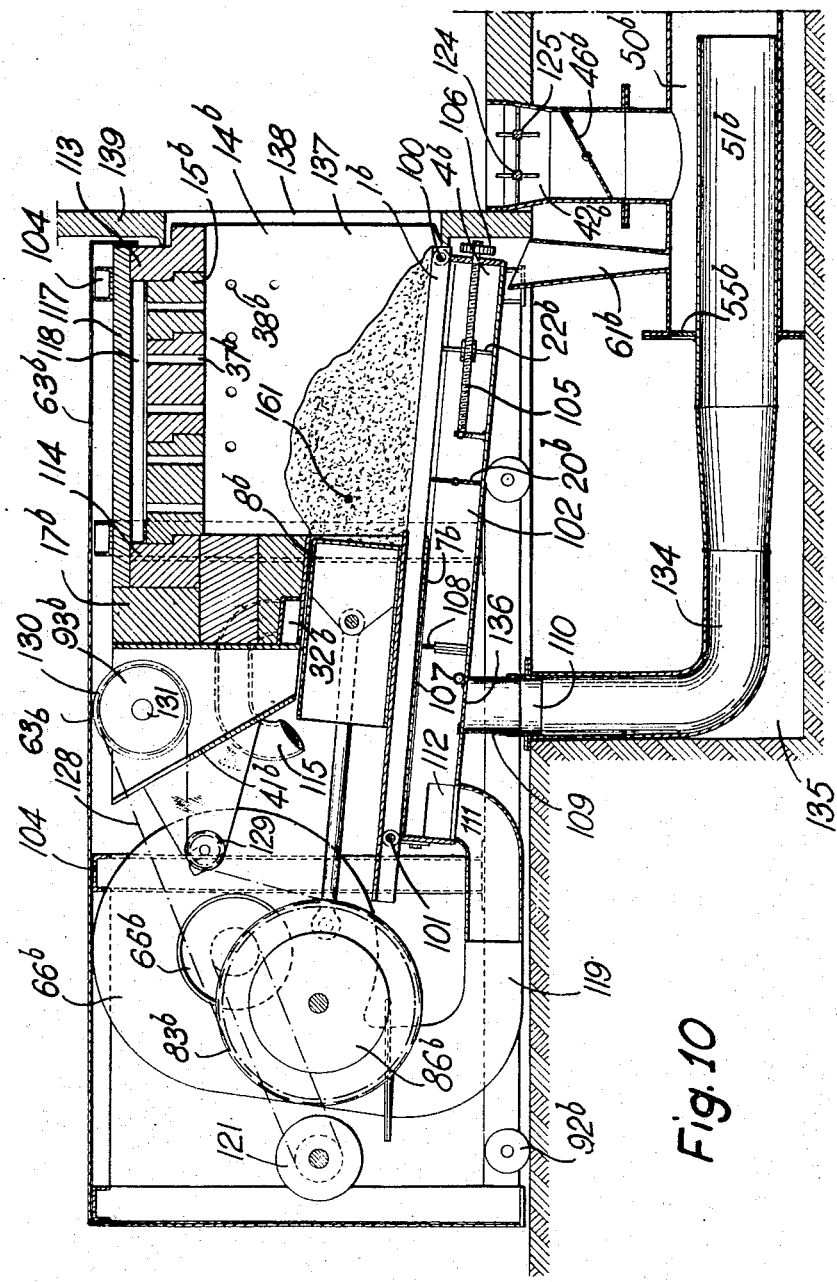
FIG. 10 shows in section such a fire-chamber/burner of relatively low power.

Reference is now had to FIG. 10, whereon the fire-chamber/burner is provided with a grid 1b consisting of relatively close-pitched smooth, parallel and inclined bars through the extremities of which extend rods 101 provided with bar spacers, said rods having their extremities supported in the edges of the side members of a box 4b placed beneath said grid.

The lower box 4b consists in point of fact of two angle-iron elements 102. These elements have the edge of one of their flanges welded to a bottom 103 with raised edges bolted to the uprights 104 of an external member, which member is enclosed by the sheet-metal of an outer radiation recovery jacket 63b. Between the vertical flanges of angle-iron 102 is placed a solid valve 22b having at its centre a nut co-operating with an adjustment screw 105 which is provided, at its extremity projecting from box 4b, with a spur gear 106 which permits external adjustment of the position of said valve by means of a flat rack which is engaged and operated manually.

A single flap-valve 20b mounted on a pivotal shaft is disposed upstream of valve 22b at a relatively small distance from the forward edge of the smooth plate 7b which covers the tops of the grid bars and constitutes the bottom of the box through which ram 8b moves.

Beneath said smooth plate 7b, box 4b is provided with a counter-plate 107 extending to the rear end-closure of the box, and beneath said counter-plate 107 is positioned, within slideways, a perforated obturator 108 which forms a diaphragm of fixed adjustment for admitting primary air. Upstream of diaphragm 108, the bottom of box 4b is provided with a vertical duct 109 over which is fitted a sliding sleeve 110 which joins onto a pipe which will be described hereinafter. To the rear end of said bottom is joined the delivery pipe 111 of a blower, and at the same level as this joint the vertical flanges of angle-irons 102 embody secondary-air intake indents 112, as will be more clearly explained in what follows, and these indents are possibly associated with pressure and flow adjustment diaphragms.

Over the forward part of their lengths, the horizontal coplanar flanges of angle-irons 102 serve as supports for the fire-chamber pillars 14b. These pillars support a flat crown 15b and both the pillars and the crown consist of bricked elements, the crown voussoirs being joggle-jointed to ensure strength, in cooperation with bolts and wedges which render them rigid with the fire-chamber side-member.

On the side of the fire-chamber opening, the pillar and roof bricking includes a raised rib 113. At the closed end of the fire-chamber, the latter as a whole is closed by a likewise bricked gable 17b having a peripheral rib 114 similar to rib 113, and through said gable is provided an aperture for the ram 8b through suitable vertical sheeting. In the rear part of said sheeting is provided a cooling bank 32b which communicates at one end, through an ascending pipe 34b, with one of the secondary-air boxes by extending through the horizontal flange of the corresponding angle-iron 102, and which, at the other end, opens in a bent pipe 115 the outlet of which is turned towards the upper face and head of ram 8b, by circumventing a supply hopper 41b the open bottom of which is positioned above the upper solid face of said ram, this opening being uncovered as the ram withdraws.

Upon ribs 113 and 114 are joined, side by side, refractory (or compressed asbestos) lateral and upper partitions 116 and 117 respectively, bolted to the members 104, as a result of which the bricking hereinbefore described is surrounded by a secondary-air distribution duct 118. To this end, moreover, partitions 116 and 117 have their bottoms bolted to the raised portions of the bottom 103.

At appropriately selected places in the roof bricking are provided perforations 37b for distributing secondary air into the fire-chamber, and the bricking of pillars 14b is likewise provided with similar perforations 38b.

The members 104 support a sheet-metal wall 63b forming a jacket for recovering the radiation heat of the fire-chamber, and the entire assembly is supported on wheels 92b above a rolling track, the clearance between said track and the edge of said sheet-metal enabling air to be drawn in.

The air is sucked in through the intake 65b of a single centrifugal blower 66b, said intake being equipped with inlet regulating shutters (not shown). The bent delivery end of said blower leads into a conduit 111 via a laterally offset portion 119. The rotor of the blower is rotated, through pulleys and a belt 120, by a single motor 121 supported on the rear part of member 104. Through a coupling 122, this motor also drives the input shaft of a reduction gear 88b, the take-off shaft of which supports an electromagnetic clutch 86b driving a plate 83b having a toothed rim and provided on its side with a single throw which actuates a forked rod 82b pivotally connected directly into the ram 8b.

A shaft rigid with plate 83b emerges from reduction gear 88b and carries a sprocket wheel 120 the associated chain 121 of which drives the pinion 123 of a cinders disintegrator having two shafts 124 and 125 with crossed spurs, which shafts are intercoupled by a pair of constant-mesh gearwheels 126 and 127.

The toothed portion of plate 83b drives a chain 128, the lower run of which passes over a tension adjusting wheel 129. Through a wheel 130, said chain rotates a shaft 131 which drives a retractable feed screw 93b adapted to be stowed on either side of hopper 41b.

Laterally, and at a suitable level dependent upon the size of the casing of blower 66b, the ram is provided on either side with a pair of lugs 132 forming cups against the inside of which bear the ends of compression springs 84b which, in co-operation with fixed bearing points 133, are designed to urge ram 8b into the closed position. In the interest of clarity on the drawing, only one of these springs is shown on FIG. 11, in the compressed condition, the ram being in the retracted position.

The lower end of box 4b surmounts a hopper 61b for collecting sifted material. The cinders disintegrator surmounts an ash collecting hopper 42b the lower part of which is covered by a swivelling flap 46b fitted with a counterweight for restoring it automatically to the closed position, but the shaft of said flap is connected by a system of rods to the throw of plate 83b, whereby to cause said flap to be opened when the throw attains its extreme rearward position.

The two hoppers 61b and 42b are joined to a barrel-plate 50b into which is inserted, eccentrically and as low as possible, a blowing tube 51b connected through a bent duct 134 running flush to the top of a pit 135 level with the rolling track of wheels 92b, where it receives the flange of the sliding and raisable sleeve 110. Above the conduit 51b, the front end-closure of barrel-plate 52 is provided with an automatic valve 55b which admits air for blasting any dusty ash accumulated above said conduit 51b.

The by-pass 109 is normally shut off by a lowered valve 136, and when said valve is in its raised position it shuts off box 4b.

This valve is operated through its shaft by an electromagnetic control means (not shown) which will be described hereinafter.

As is clearly shown in FIG. 15, and in FIG. 10, the fire-chamber/burner hereinbefore described can be moved up in such manner that a nose 137 formed in the bricking of the pillars and the crown engages into the hole 138 of a boiler 139 which is connected through a smoke flue 140 to a chimney 141 in an edifice to be heated by said boiler. Within the boiler room 142, and more specifically issuing from pit 135, a conduit 143 which is connected to barrel-plate 50b through suitable bends leads up to an apparatus 144 for separating the blowing air and the entrained ash. This apparatus is connected to a bin 145 from above, through a removable sealing joint.

As can be seen from FIG. 14, the apparatus 144 comprises a cylindrical chamber into which the conduit 143 opens tangentially and the bottom of which opens up above bin 145. The gyratory motion which centrifuges the solid particles onto the wall of said chamber is assisted by internal ribs 146. Positioned centrally between the ribs is an ascending air outlet duct open at both ends, and that end which projects above the upper end-closure of said chamber is capped by a dust bag 148 which is permeable only to air and which retains any fine dust that may not have deposited.

As FIG. 18 shows, the apparatus 144 and the bin 145 can be placed either within the boiler room 142 or outside thereof, as represented by the locations 145a and 145b, which illustrate these alternative methods of construction.

Adjacent the boiler room 142 is installed a coal bunker 149 having a grated supply vent 150. An access trapdoor 151 provides communication between the boiler room and the bunker.

The bottom of said bunker is provided with a dihedral floor 152 resting on cleats 153 fixed to the walls and to intermediate supports 154. Upon supports 154 is placed a channel 155 through which extends the screw 93b. Said channel extends through a pad 156 which closes the aperture 157 in a separating partition 158 between the boiler room and the bunker. Within boiler room 142, said screw is contained within a tubular conduit 159 provided with inspection holes 160 and leading up to one or the other of the side walls of hopper 41b.

Essentially, the manner of operation of the apparatus described hereinabove is identical to that described at the beginning of the present specification with reference to FIGS. 1 through 9, namely with respect to the feed system, the combustion of the coal, the supply of primary and secondary air and the evacuation of the ashes, like parts being designated by like numerals followed by the subscript b.

In the latter-mentioned fire-chamber, the inclination of the grid is relatively small, being about 5° to the horizontal.

Since a common blower is used for the primary air, the secondary air and the pneumatic ash expelling system, the delivery pressure is selected to give the necessary maximum effect to such expulsion, while the decreasing pressures required for the secondary and primary air deliveries are produced by the diaphragms, particularly diaphragm 108.

The butterfly valve 20b is slaved to the adjusted operating conditions and is adapted to create a powerful blowing head-compartment, for utilization during start-up and during slowed-down operating conditions, as will be disclosed hereinafter.

When valve 20b is in the open position, the adjustable baffle 22b determines the size of the primary-air blowing compartment during maximum operating conditions.

The size of the apertures 112, which can possibly be associated with diaphragms (not shown), will determine the secondary-air adjustment.

Secondary air tapped through conduit 32b enables cooling both the gable 17b of the ram box and the ram 8b itself, while at the same time protecting hopper 41b from heating. The ram is finally cooled by the jet issuing through nozzle 115. During operation of the ram, this jet protects the upper face of the latter, while at the same time preventing any blowback from the flames or gases in the fire-chamber.

Automatic operation of the system is ensured principally by means of an electric contact-type thermostat placed on the boiler or in the premises to be heated, and also by a programmed timer, independently of a "Stop-Start" button. The thermostat is adapted to trigger the timer, and the latter can also be started at the time of ignition.

The slats fitted to the intake 65b are operated by electromagnetic means and permit either reduced-capacity operation with a reduced air flow, or full-capacity operation. The same electromagnetic means operate butterfly-valve 20b and valve 56.

An ignition probe 161 can be inserted from the side of the fire-chamber and it consists of a shielded electrical resistance which is energized for a certain time by means of a switch. Although the probe is manually controlled it could be controlled automatically by the timer, both as regards its energization and its insertion and retraction.

A "Stop-Start" button is likewise provided for the apparatus as a whole, and this button produces energizing of motor 121, actuation of screw 93b and also of ram 8b (indirectly, through electromagnetic clutch 86b, the excitation of which is adjusted by a potentiometer in order to limit the forces involved), as well as direct drive to the blower. As long as the thermostat has not reached the desired operating temperature, motor 121 will remain in operation but the timer can cause clutch 86b to become periodically inoperative in order to avoid overfilling the fire-chamber.

Thus, when starting up under cold conditions, coal is fed manually onto the grid by way of two ram cycles, after which ignition is effected with electric probe 161, which probe is then deactivated and withdrawn after the proper ignition time has elapsed. The functional cycle of the fire-chamber/burner must then commence under reduced operating conditions.

These reduced operating conditions enable the crown and the pillars to reach a temperature sufficient for them to radiate onto the glowing and burning fuel bed, and at the same time to heat the air adequately.

During this period of reduced operating conditions, no coal is supplied, clutch 86b remaining disengaged and the cold-positioned coal being ignited by the probe; alternatively, the coal remaining from the preceding cycle may be adequate. The slats of intake 65b are closed and reduce the air flow to a suitable fraction. The head blowing compartment is diminished in length by the upstanding butterfly-valve 20b.

However, once these reduced operating conditions have produced their effect over the period determined by the programmed timer, the system changes to normal operating conditions, thereby causing engagement of clutch 86b and consequent opening of the slats, flattening of valve 20b and periodic operation of cinder blasting valve 138, the crusher remaining in continuous operation.

The timer permits of so controlling this full-capacity operation as to obtain alternating shutdown and operating periods, but without overextending the shutdown periods in order to prevent too big a drop in the temperature of the crown and the pillars.

Should the thermostat cut off operation, the clutch is caused to disengage, as a result of which the ram, regardless of its position, is urged back into obturation by springs 84b. Valve 136 opens, as a result of which ventilation is maintained at a maximum on the secondary air and on the cinders blasting circuit, but this phase is limited by the timer which cuts off the supply to motor 121. When this happens, all ventilation ceases and the timer incorporates a zeroing mechanism, thereby permitting resumption of the cycle.

When the thermostat cuts in again, it causes automatic resumption by operating on the timer, which in turn causes the system to revert to reduced operation for the predetermined time, before reverting once more to normal operating conditions.

To enable special needs to be met, such as periodical or permanent reduction to fractional-capacity operation of the fire-chamber/burner, the reduction gear 86b can be provided with a speed changing stage for producing a limited intermediate opening of the blower slats. Also, without in any other way modifying the mechanism, a manual control can be provided to modify the operating conditions during in-between-season periods for example.

What I claim is:

1. In combustion apparatus for agglutinant and swelling coals having a high content of volatile materials, in combination, a fire chamber having two extremities, a stationary grate, means for simultaneously and in synchronism introducing coals on said grate at a first extremity of said fire chamber, obturating said first extremity, forming on said grate and in said fire chamber a thick layer of said coals, and propelling said layer on said grate in the direction of the second extremity of said fire chamber which is open, said fire chamber including a refractory wall located at a relatively small distance from said thick layer in the vicinity of said first extremity, to thereby intensively radiate heat on said thick layer in a corresponding zone, means for introducing primary air under said grate, means for introducing secondary air in said fire chamber over said thick layer, and means for expelling cinders resulting from the combustion of said coals situated in the vicinity of said second extremity, said fire chamber comprising a crown, pillars supporting said crown, chimneys in said pillars, with at least one secondary air outlet orifice in each pillar, said chimneys communicating at the upper part of each pillar with a distributing chamber and therethrough with internal conduits inside each arch of said crown, each arch having nozzles converging beneath said crown.

2. In combustion apparatus for agglutinant and swelling coals having a high content of volatile materials, in combination, a fire chamber having two extremities, a stationary grate, means for simultaneously and in synchronism introducing coals on said grate at a first extremity of said fire chamber, obturating said first extremity, forming on said grate and in said fire chamber a thick layer of said coals, and propelling said layer on said grate in the direction of the second extremity of said fire chamber which is open, said fire chamber including a refractory wall located at a relatively small distance from said thick layer in the vicinity of said first extremity, to thereby intensively radiate heat on said thick layer in a corresponding zone, means for introducing primary air under said grate, means for introducing secondary air in said fire chamber over said thick layer, means for expelling cinders resulting from the combustion of said coals situated in the vicinity of said second extremity, a gable closing the first extremity of said fire chamber, and cooling means operatively associated with said gable for admitting a by-pass stream of said secondary air.

3. In combustion apparatus for agglutinant and swelling coals having a high content of volatile materials, in combination, a fire chamber having two extremities, a stationary grate, means for simultaneously and in synchronism introducing coals on said grate at a first extremity of said fire chamber, obturating said first extremity, forming on said grate and in said fire chamber a thick layer of said coals, and propelling said layer on said grate in the direction of the second extremity of said fire chamber which is open, said fire chamber including a refractory wall located at a relatively small distance from said thick layer in the vicinity of said first extremity, to thereby intensively radiate heat on said thick layer in a corresponding zone, means for introducing primary air under said grate, means for introducing secondary air in said fire chamber over said thick layer, and means for expelling cinders resulting from the combustion of said coals situated in the vicinity of said second extremity, said means for introducing, obturating and propelling comprising a ram mechanism having safety springs operatively connected to said mechanism for returning said ram to a position closing said first extremity, motor means, and mechanical connecting means between said motor means, and said ram, said connecting means comprising an adjustable clutch, a speed variator and a reduction gear unit.

4. In combustion apparatus for agglutinant and swelling coals having a high content of volatile materials, in combination, a fire chamber having two extremities, a stationary grate, means for simultaneously and in synchronism introducing coals on said grate at a first extremity of said fire chamber, obturating said first extremity, forming on said grate and in said fire chamber a thick layer of said coals, and propelling said layer on said grate in the direction of the second extremity of said fire chamber which is open, said fire chamber including a refractory wall located at a relatively small distance from said thick layer in the vicinity of said first extremity, to thereby intensively radiate heat on said thick layer in a corresponding zone, means for introducing primary air under said grate, means for introducing secondary air in said fire chamber over said thick layer, and means for expelling cinders resulting from the combustion of said coals situated in the vicinity of said second extremity, said fire chamber having flat surfaced pillars and a crown, secondary air outlets in said flat surfaced pillars and crown, a refractory flat plate surrounding said pillars and crown at a distance thereby forming secondary air circulation ducts, said fire chamber further having at its first extremity a gable and cooling ducts disposed therein and tapped to said secondary air circulation duct, said cooling ducts terminating in a bent nozzle directed on said introducing means.

5. In apparatus as claimed in claim 2 wherein the means for introducing primary air comprises means for introducing primary air through a limited part of the surface of said grate in decreasing quantities to successive areas with a maximum output in the vicinity of said first extremity.

6. In apparatus as claimed in claim 2 wherein said means for introducing secondary air comprises circuit means in the wall of said fire chamber and ejecting means in said wall opening inside said chamber, above and over the sides of said layer for distributing heated secondary air in a direction opposite to the direction of flow of primary air.

7. In apparatus as claimed in claim 2 wherein the refractory wall progressively deviates from said layer in a sense corresponding to the completion of the combustion.

8. In apparatus as claimed in claim 2, a grate in said fire chamber comprising smooth and parallel separated bars extending in the direction of the propulsion of said layer, said bars being supported at said second extremity in abutment, and in sliding fit at said first extremity, said bars being relatively closely spaced, whereby the permeability of said grate is at a minimum yet is greater than that of said layer.

9. In apparatus as claimed in claim 2, wherein the means for introducing primary air comprises a primary air inlet box under said grate and in said box, beneath said grate, a plurality of successive valves for regulating in adjustable manner distribution of said primary air in a corresponding plurality of distribution zones.

10. In apparatus as claimed in claim 2, cinder expelling means which comprises an entrance at said second extremity of the fire chamber, an ash overflow sill above said entrance, and means for taking up and simultaneously conveying said cinders towards a storage zone, said entrance including selecting and crushing means.

11. In apparatus as claimed in claim 2 wherein said means for introducing secondary air comprises secondary air conveying boxes flanking the means for introducing the primary air.

12. In apparatus as claimed in claim 2, a recuperation jacket surrounding at least said fire chamber and an inlet of one of said air introducing means.

13. In apparatus as claimed in claim 4 wherein the means for introducing primary air and the means for introducing secondary air comprise a single blower, adjustable diaphragms distributing said primary air and said secondary air, and upstream an adjustable diaphragm distributing primary air, a changeover valve alternatively sealing said primary air and a by-pass duct connected to said pneumatic cinder expelling means.

14. In apparatus as claimed in claim 4, a single motor, a single blower transmission means between said blower and said motor, a ram operative mechanism, an intermediate hopper, a fuel conveyor operatively connected to said ram mechanism through said intermediate hopper and transmission means between said motor and said ram operative mechanism comprising a reduction gear, a clutch, and spring means having an elastic action which is directed for closing said fire chamber by said ram mechanism.

15. In apparatus as claimed in claim 14, a cinder disintegrator and transmission means between said cinder disintegrator and said reduction gear.

16. In apparatus as claimed in claim 15, an end closure covering said fire chamber, said single motor and said single blower, said blower having an intake port opening in said end closure.

17. In apparatus as claimed in claim 15, a retractable sleeve between said means for introducing primary air and a connecting part of a cinder blowing pipe, a sifted material collecting hopper surmounted by the lowermost part of a primary air box situated under said grate, a disintegrated cinder collecting hopper, the top part of which comprises said mechanical cinder disintegrator, a periodically opening obturator in said collecting hopper, connecting means between said obturator and said ram mechanism, an ash driving barrel plate, said blowing conduit and said hoppers communicating with said ash driving barrel plate, said ash driving barrel plate having extremities and including an automatic air-valve at one extremity, the other extremity being adapted for connection with a duct opening in an evacuating collector to a cinders depositing apparatus.

18. In apparatus as claimed in claim 4 an ignition probe in contact with said thick layer of fuel.

References Cited by the Examiner
UNITED STATES PATENTS

| | | | |
|---|---|---|---|
| 2,057,450 | 10/1936 | Schrenk | 110—10 |
| 2,086,760 | 7/1937 | Wood | 122—4 |
| 2,668,521 | 2/1954 | Beecher | 122—2 |
| 3,005,446 | 10/1961 | Kock | 122—376 |
| 3,031,981 | 5/1962 | Smauder | 110—8 |
| 3,057,308 | 10/1962 | Knipping | 110—109 X |
| 3,152,562 | 10/1964 | Cohan et al. | 110—8 |

KENNETH W. SPRAGUE, *Primary Examiner.*